United States Patent
Fang (10) Patent No.: US 8,011,609 B2
(45) Date of Patent: Sep. 6, 2011

(54) PEPPER MILL

(75) Inventor: Ming-Hui Fang, Tainan (TW)

(73) Assignee: Yienn Lih Enterprise Co., Ltd. (TW)

(*) Notice: Subject to any disclaimer, the term of this patent is extended or adjusted under 35 U.S.C. 154(b) by 162 days.

(21) Appl. No.: 12/571,568

(22) Filed: Oct. 1, 2009

(65) Prior Publication Data

US 2010/0200685 A1 Aug. 12, 2010

(30) Foreign Application Priority Data

Feb. 9, 2009 (TW) .............................. 98104071 A (51) Int. Cl.
*A47J 17/00* (2006.01)
*A47J 43/00* (2006.01)
(52) U.S. Cl. .................................... 241/169; 241/169.2
(58) Field of Classification Search .................. 241/169, 241/169.2
See application file for complete search history.

(56) References Cited

U.S. PATENT DOCUMENTS

| 617,490 | A | * | 1/1899 | Lawton | 222/239 |
| 1,366,929 | A | * | 2/1921 | Pasnik | 222/487 |
| 2,488,254 | A | * | 11/1949 | Allen | 141/21 |
| 4,573,244 | A | * | 3/1986 | Holcomb et al. | 241/169 |
| 2003/0010855 | A1 | * | 1/2003 | Holcomb et al. | 241/169 |

* cited by examiner

*Primary Examiner* — Bena Miller
(74) *Attorney, Agent, or Firm* — Sheridan Ross P.C.

(57) ABSTRACT

A pepper mill includes a receiving unit, a grinding unit, a coupling unit and a closure unit. The receiving unit includes a container body defining a receiving space for receiving peppercorns, and a driving member disposed movably in the receiving space. The coupling unit is disposed in the receiving space and is driven rotatably by the driving member. The grinding unit is disposed in the receiving space and is coupled co-rotatably to the coupling unit for grinding the peppercorns to result in ground pepper. The closure unit includes a closure member movable relative to the grinding unit between a closed position so as to block discharge of the ground pepper through a discharge end of the container body, and an opened position so as to permit discharge of the ground pepper through the discharge end.

10 Claims, 7 Drawing Sheets

PEPPER MILL

CROSS-REFERENCE TO RELATED APPLICATION

This application claims priority of Taiwanese Application No. 098104071, filed on Feb. 9, 2009.

BACKGROUND OF THE INVENTION

1. Field of the Invention

The invention relates to a grinder, more particularly to a pepper mill.

2. Description of the Related Art

A conventional pepper mill generally has a receiving unit for receiving peppercorns therein, and a grinding unit disposed in a bottom part of the receiving unit for grinding the peppercorns into ground pepper. The grinding unit generally includes a stationary annular outer grinding seat, and an inner grinding seat disposed within the outer grinding seat, cooperating with the outer grinding seat to define a grinding opening therebetween, and rotatable relative to the outer grinding seat for grinding the peppercorns into ground pepper, discharged through the grinding opening.

However, after use, when the conventional pepper mill is put on a cabinet or a dining table, a portion of residual ground pepper will fall out of the conventional pepper mill and scatter on the cabinet or the dining table, thereby making the cabinet or the dining table untidy.

SUMMARY OF THE INVENTION

Therefore, the object of the present invention is to provide a pepper mill capable of preventing residual ground pepper from falling out therefrom.

Accordingly, a pepper mill of the present invention comprises a receiving unit, a coupling unit, a grinding unit, and a closure unit. The receiving unit includes a container body that surrounds an axis, that defines a receiving space for receiving peppercorns, and that has a discharge end for discharging ground pepper, and a driving member that is disposed movably in the receiving space. The coupling unit is disposed in the receiving space and is driven rotatably by the driving member. The grinding unit is disposed in the receiving space and is coupled co-rotatably to the coupling unit for grinding the peppercorns in the receiving space to result in the ground pepper. The closure unit includes a closure member disposed under the grinding unit, and movable along the axis relative to the grinding unit between a closed position so as to block discharge of the ground pepper through the discharge end of the container body, and an opened position so as to permit discharge of the ground pepper through the discharge end of the container body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
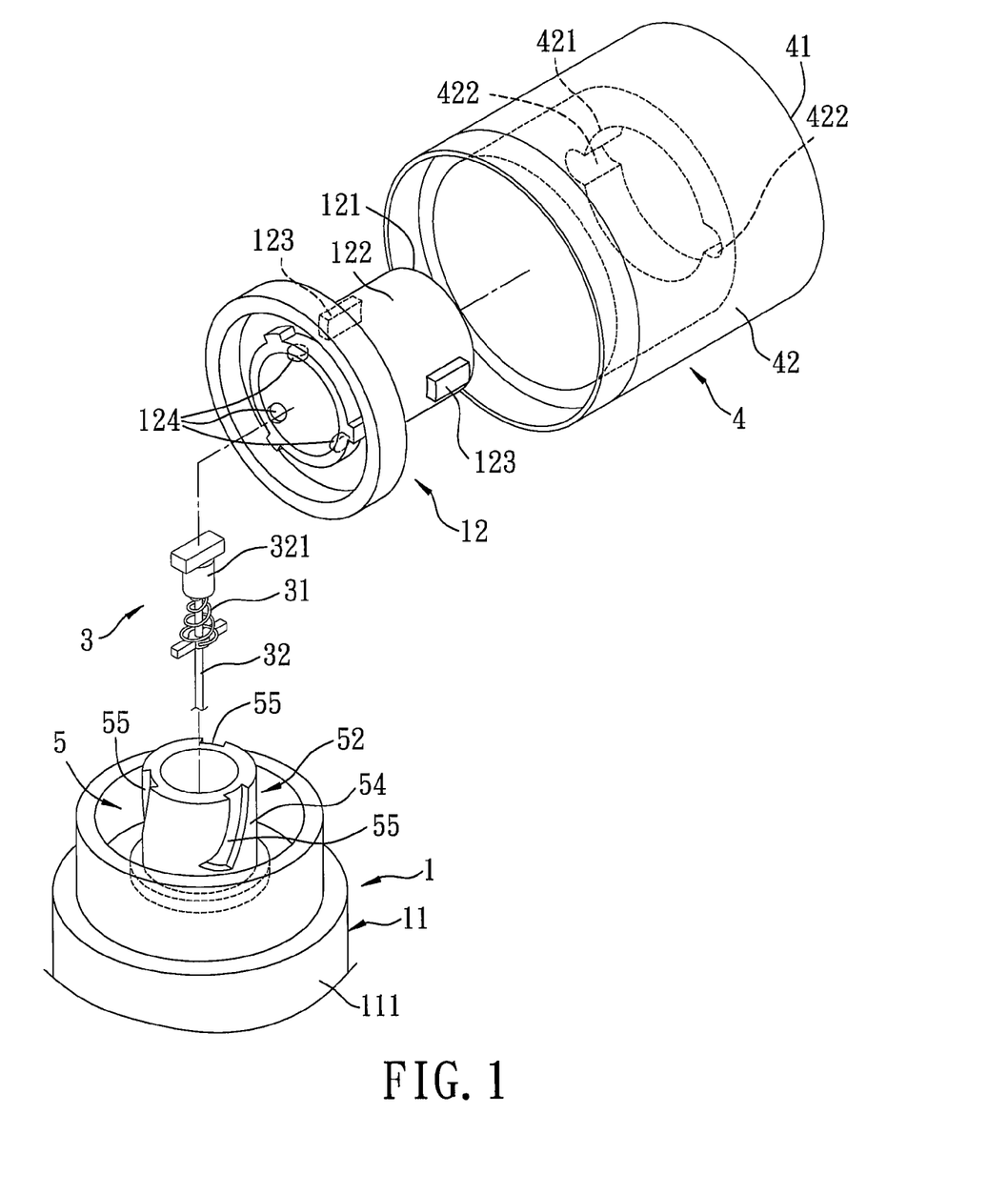
FIG. 1 is a fragmentary exploded perspective view of a first preferred embodiment of a pepper mill according to the invention.
Figure 2:
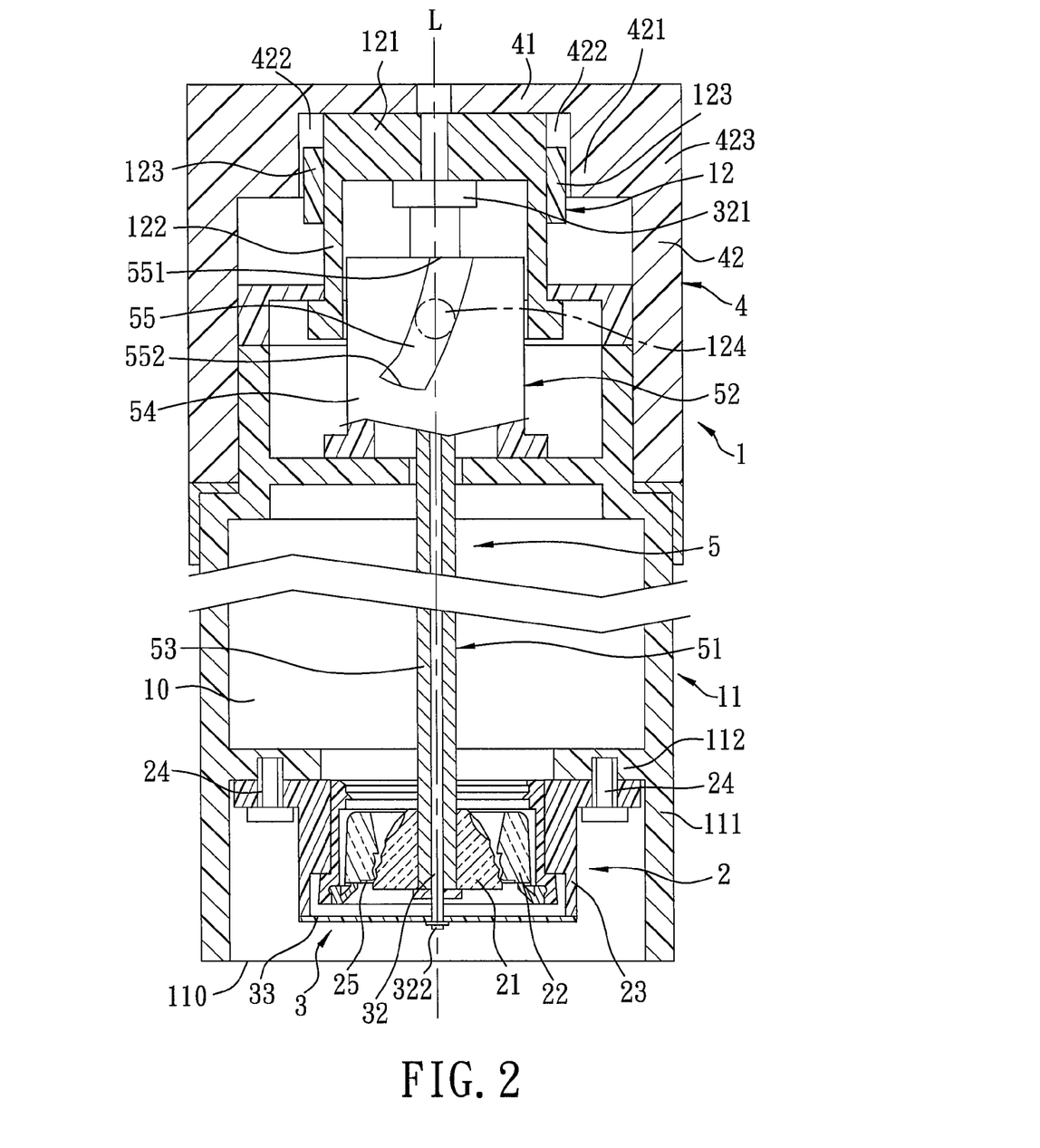
FIG. 2 is a partly sectional view of the first preferred embodiment, illustrating a closure member at a closed position.
Figure 3:
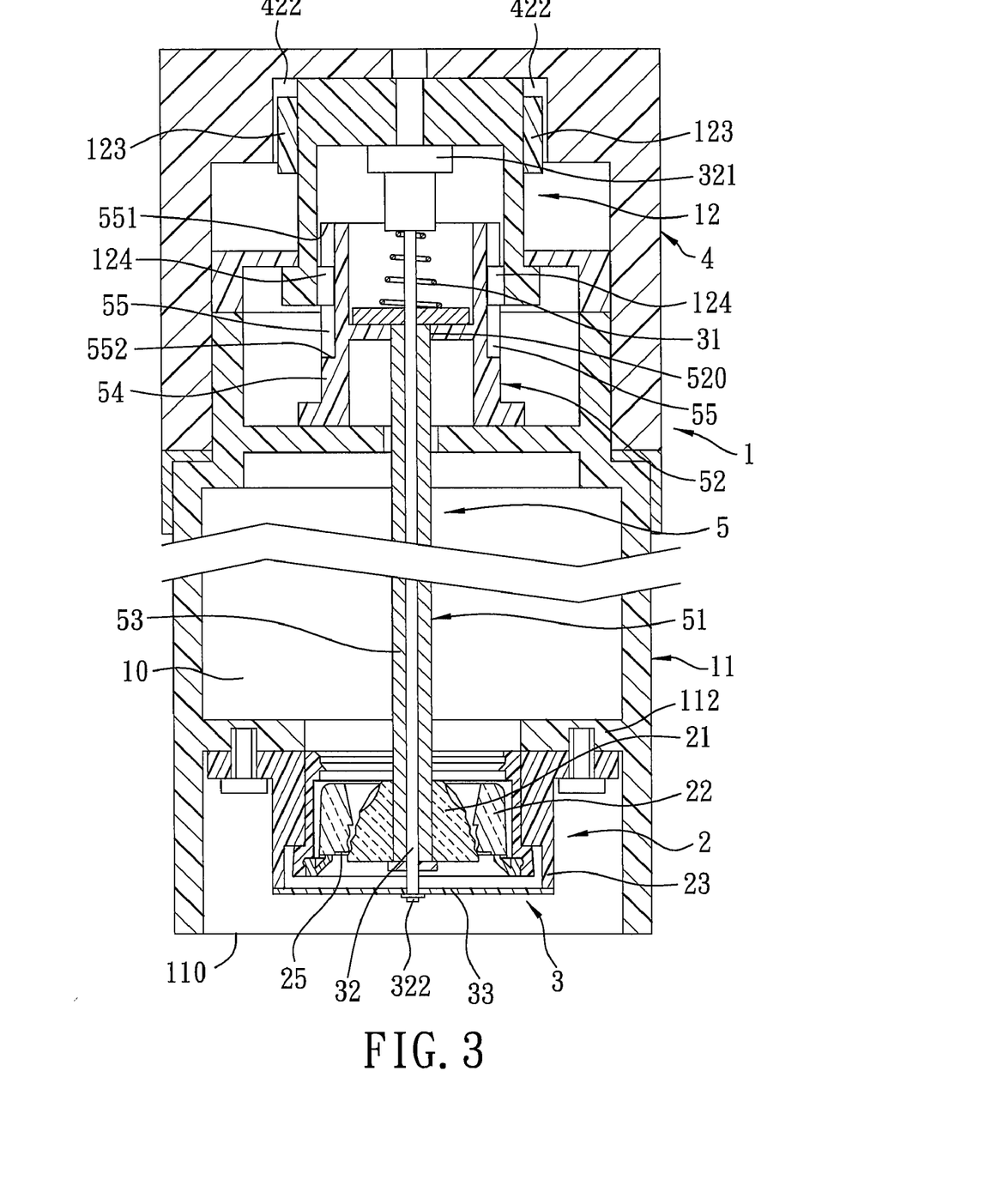
FIG. 3 is a fragmentary sectional view of the first preferred embodiment, illustrating the closure member at the closed position.

As shown in FIGS. 1 to 3, the first preferred embodiment of a pepper mill according to the present invention comprises a receiving unit 1, a coupling unit 5, a grinding unit 2, and a closure unit 3.

In this embodiment, the receiving unit 1 includes a container body 11, a cover member 4, and a hollow driving member 12.

The container body 11 includes a surrounding container wall 111 that surrounds an axis (L), that defines a receiving space 10 for receiving peppercorns (not shown), and that has a discharge end 110 for discharging ground pepper, and an annular mounting wall 112 that projects radially and inwardly from the surrounding container wall 111.

The cover member 4 is coupled to a top end of the container body 11 opposite to the discharge end 110, and is rotatable about the axis (L) relative to the container body 11. The cover member 4 includes a cover wall 41, and a stepped surrounding wall 42 extending in a direction toward the discharge end 110 from a periphery of the cover wall 41. In this embodiment, the surrounding wall 42 has an upper wall section 421 projecting toward the discharge end 110 from the cover wall 41 and formed with a pair of diametrically opposite engaging slots 422, and a lower wall section 423 extending toward the discharge end 110 from the upper wall section 421 and having an inner diameter larger than that of the upper wall section 421.

In this embodiment, the driving member 12 is disposed movably in the receiving space 10 and has an annular side wall 122 surrounding the axis (L) and surrounded by the surrounding wall 42 of the cover member 4, an end wall 121 connected to a top end of the annular side wall 122, and a pair of engaging blocks 123 projecting radially and outwardly from the annular side wall 122 and engaging respectively and movably the engaging slots 422 in the surrounding wall 42 of the cover member 4, i.e., the cover member 4 has a spline engagement with the driving member 12, such that the driving member 12 is co-rotatable with the cover member 4 and is movable along the axis (L) relative to the cover member 4. In this embodiment, the annular side wall 122 is provided with three protrusions 124 projecting radially and inwardly therefrom and angularly spaced apart from one another.

In this embodiment, the coupling unit 5 is formed by an elongated hollow coupling shaft 51 having a rectangular cross-section, and a coupling component 52 coupled to a top end of the coupling shaft 51 and formed with a rectangular coupling hole 520 through which the top end of the coupling shaft 51 fittingly extends, i.e., the coupling shaft 51 is coupled co-rotatably to the coupling component 52. In this embodiment, the coupling unit 5 includes an annular hollow shaft wall 53 extending along the axis (L), and an annular connecting wall 54 connected co-rotatably to a top end of the shaft wall 53 and formed with three angularly spaced-apart spiral guide grooves 55 for receiving slidably and respectively the protrusions 124 of the driving member 12 of the receiving unit 1, such that the coupling unit 5 is coupled to the driving member 12. Each of the guide grooves 55 has an open end portion 551 that opens away from the discharge end 110 of the container body 11, and an abutting end portion 552 that is formed at an innermost end thereof and that forms an angle with the open end portion 551 relative to the axis (L).

The grinding unit 2 is disposed in the receiving space 10 of the receiving unit 1 at a position under the annular mounting wall 112, and is operable for grinding the peppercorns in the receiving space 10 to result in the ground pepper. The grinding unit 2 includes an inner grinding seat 21 coupled co-rotatably to a bottom end of the shaft wall 53 of the coupling unit 5, a stationary outer grinding seat 22 surrounding the inner grinding seat 21, a sleeve seat 23 surrounding the outer grinding seat 22, and a pair of screws 24 disposed for fastening the sleeve seat 23 on the annular mounting wall 112. The outer grinding seat 22 cooperates with the inner grinding seat 21 to define a grinding opening 25 therebetween.

The closure unit 3 includes a closure member 33, an elongated connecting rod 32, and a resilient member 31. In this embodiment, the closure member 33 is disposed under the grinding unit 2 and is formed as a horizontal plate. The connecting rod 32 extends along the axis (L) through the shaft wall 53 of the coupling unit 5, and has opposite top and bottom ends 321, 322. The top end 321 of the connecting rod 32 abuts against the end wall 121 of the driving member 12 of the receiving unit 1.

Figure 4:
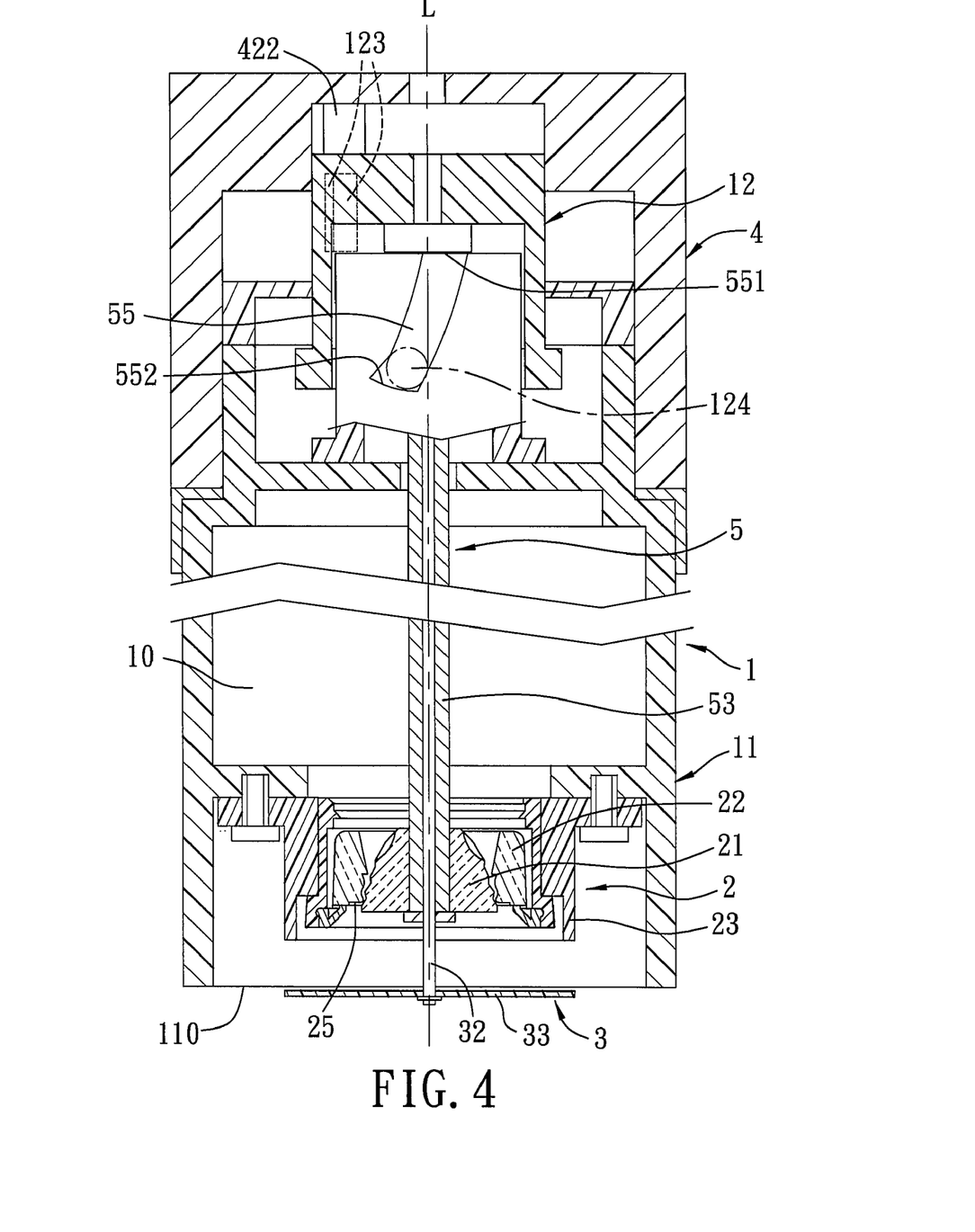
FIG. 4 is a view similar to FIG. 2, but illustrating the closure member at an opened position.
Figure 5:
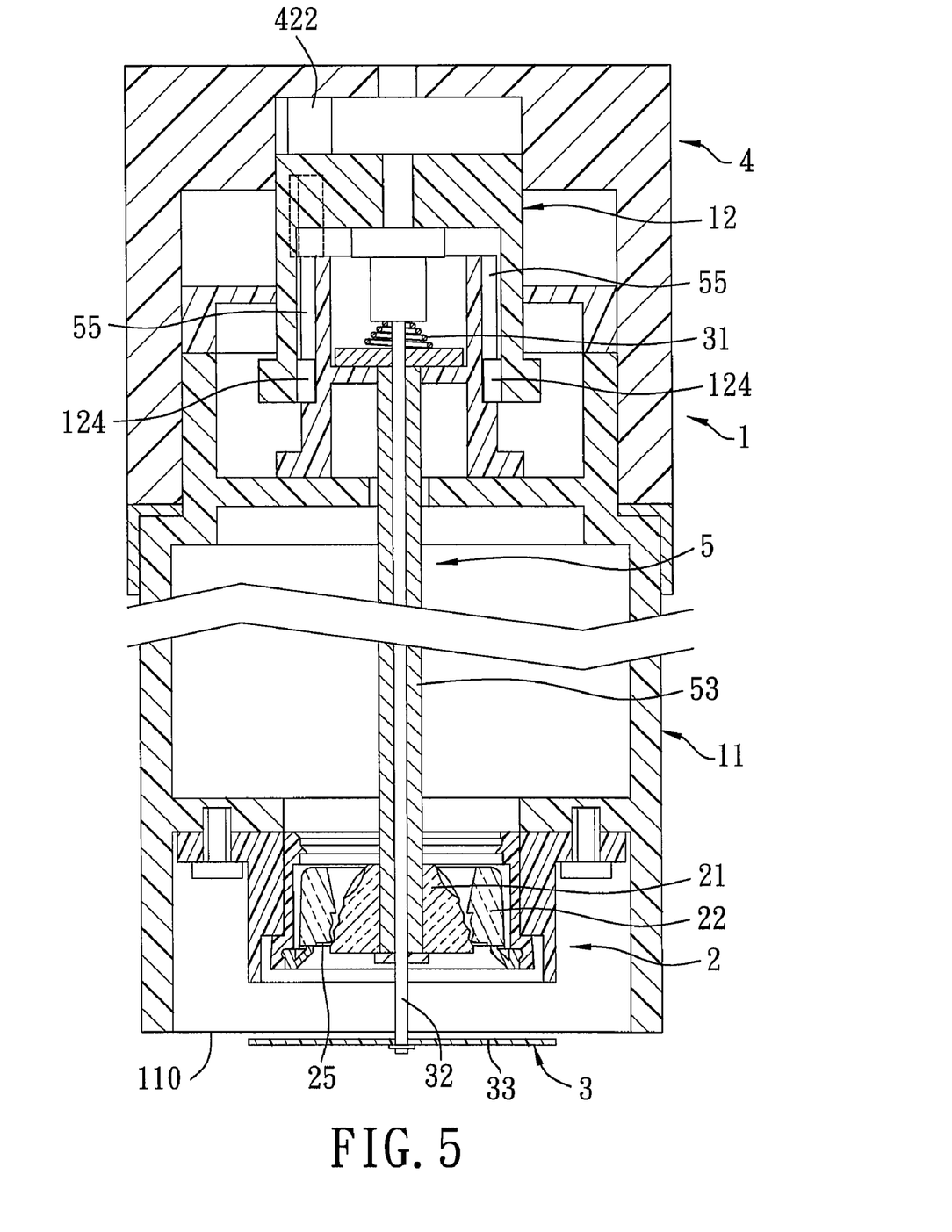
FIG. 5 is a view similar to FIG. 3, but illustrating the closure member at the opened position.

The bottom end 322 of the connecting rod 32 is secured to the closure member 33 such that movement of the connecting rod 32 results in corresponding movement of the closure member 33 relative to the grinding unit 2 between a closed position (see FIGS. 2 and 3), where the closure member 33 is disposed to block the ground pepper from falling out of the grinding unit 2 so as to block discharge of the ground pepper through the grinding opening 25, and an opened position (see FIGS. 4 and 5) so as to permit discharge of the ground pepper through the discharge end 110 of the container body 11. In this embodiment, the resilient component 31 is a spring and is sleeved on the connecting rod 32 at a position between the driving member 12 of the receiving unit 1 and the coupling shaft wall 53 of the coupling unit 5. The resilient component 31 is disposed to bias the connecting rod 32 to move in a direction away from the discharge end 110 of the container body 11 of the receiving unit 1.

In use, when a force is applied to rotate the cover member 4 of the receiving unit 1, the driving member 12 of the receiving unit 1 rotates with the cover member 4. Due to the sliding engagement between the protrusions 124 of the driving member 12 and the guide grooves 55 in the annular connecting wall 54 of the coupling unit 5, each of the protrusions 124 slides in a corresponding one of the guide grooves 55 toward the abutting end portion 552 of the corresponding one of the guide grooves 55. During such rotation of the driving member 12 and the cover member 4, the driving member 12 simultaneously moves in the direction toward the discharge end 110 of the container body 11 of the receiving unit 1 against biasing action of the resilient component 31 of the closure unit 3 until the protrusions 124 reach the abutting end portions 552 of the guide grooves 55, thereby driving the movement of the closure member 33 of the closure unit 3 from the closed position to the opened position, and thereby compressing the resilient component 31 of the closure unit 3. Afterward, when the driving member 12 is further rotated with the cover member 4, the coupling unit 5 is driven to rotate together with the inner grinding seat 21 of the grinding unit 2 relative to the outer grinding seat 22 of the grinding unit 2 for grinding the peppercorns to result in the ground pepper discharged through the grinding opening 25.

When the force applied to rotate the cover member 4 of the receiving unit 1 is removed, a restoring force of the resilient component 31 biases the connecting rod 32 and the driving member 12 to move in the direction away from the discharge end 110 of the container body 11. During the movement of the connecting rod 32 and the driving member 12, each of the protrusions 124 slides in the corresponding one of the guide grooves 55 from the abutting end portion 552 toward the open end portion 551, thereby rotating the driving member 12 and the cover member 4. The movement of the connecting rod 32 and the driving member 12 finally drives the movement of the closure member 33 from the opened position to the closed position. Therefore, after use, the closure member 33 can effectively prevent residual ground pepper from falling out of the grinding unit 2 via the grinding opening 25.

It should be noted that, while this invention is exemplified using three protrusions 124 and three guide grooves 55, only one protrusion 124 and one guide groove may be employed in other embodiments of this invention.

It should be further noted that the configuration of the closure member 33 of the closure unit 3 may vary in other embodiments of this invention as long as the closure member 33 can prevent the ground pepper from falling out of the container body 11 when at the closed position. For example, the closure member 33 may be made larger with a diameter equal to that at the discharge end 110 of the container body 11 of the receiving unit 1 so as to close the discharge end 110 of the container body 11 when at the closed position.

Figure 6:
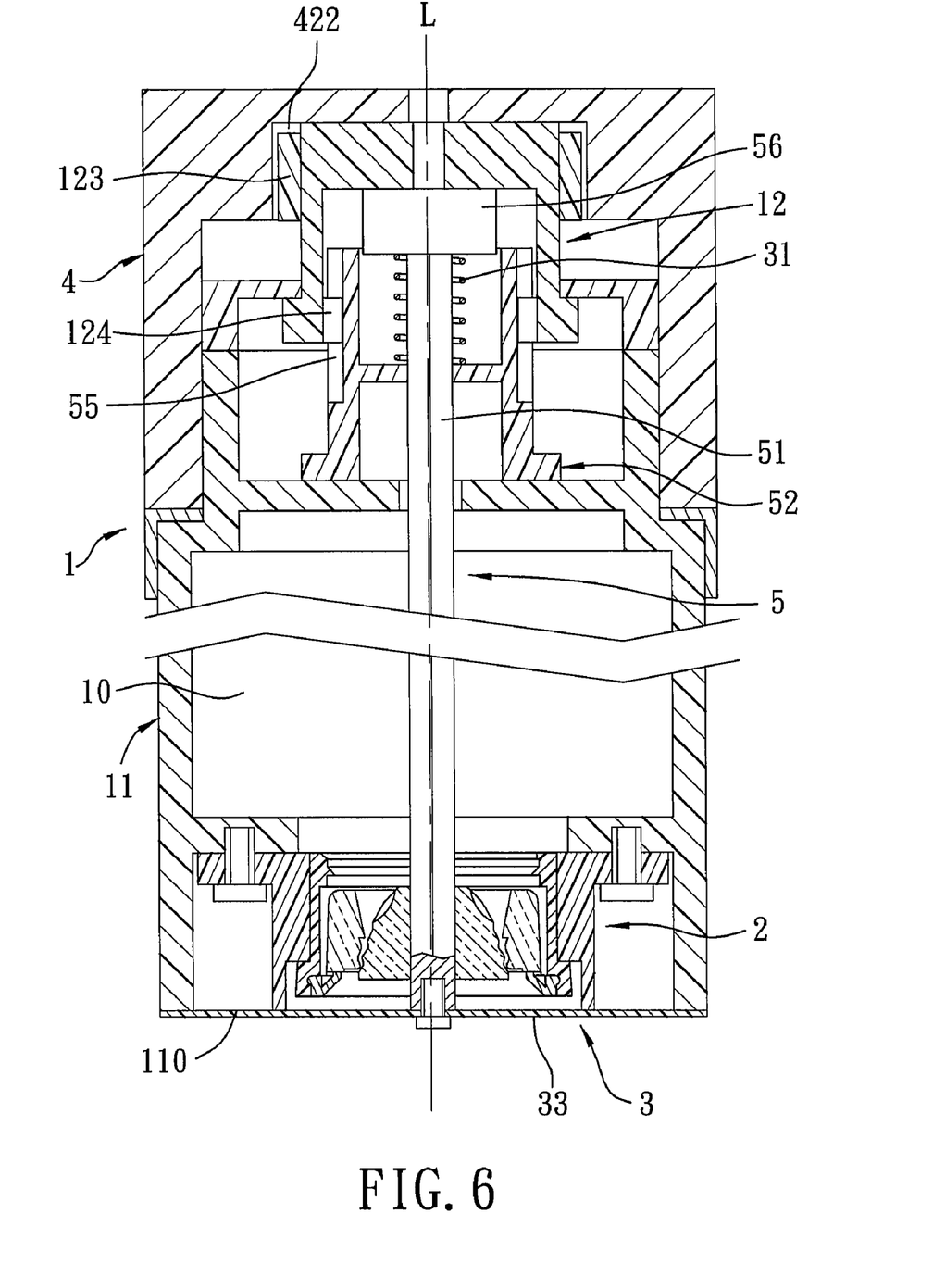
FIG. 6 is a fragmentary sectional view of a second preferred embodiment of the pepper mill according to the invention, illustrating a closure member at the closed position.
Figure 7:
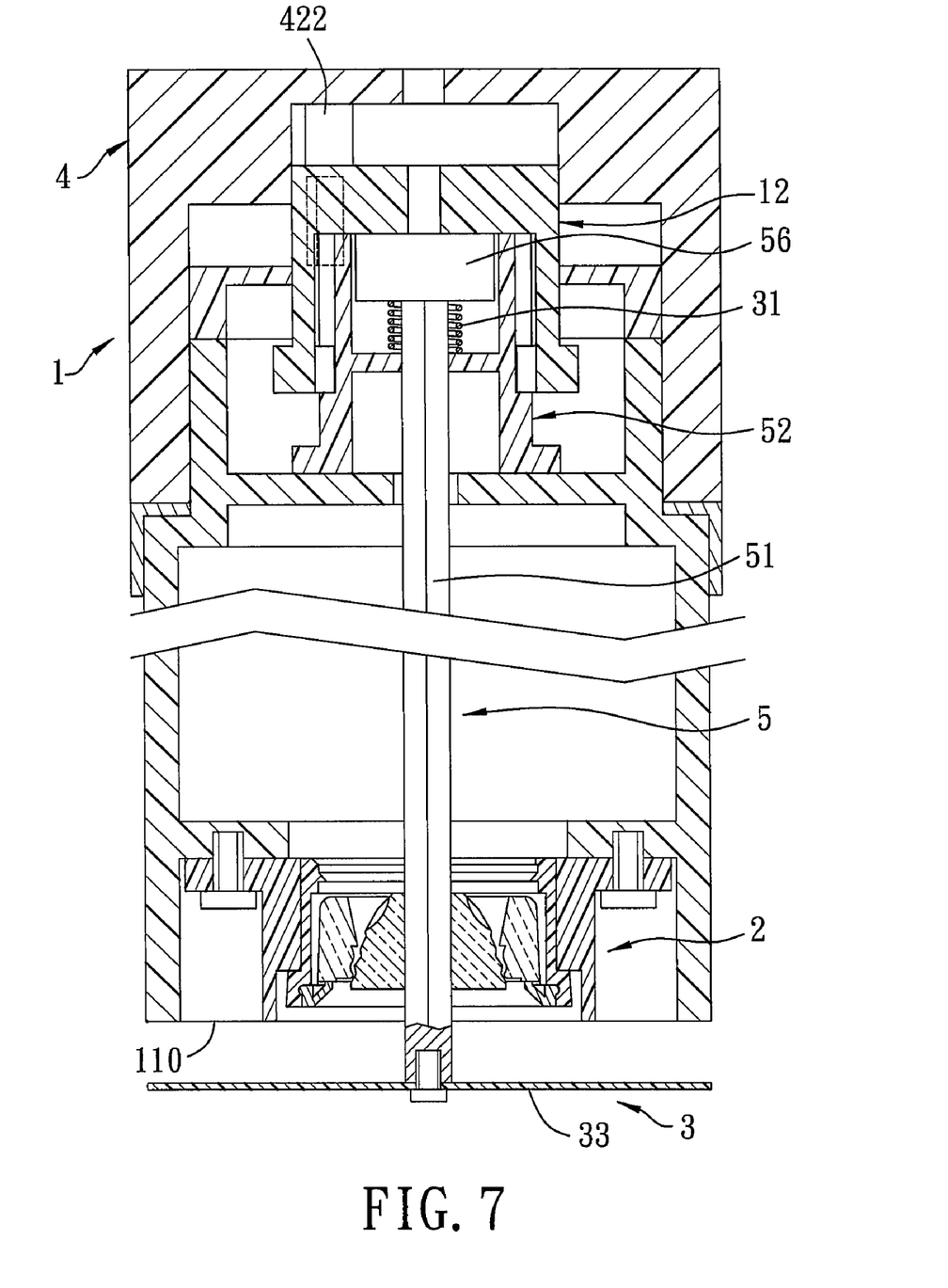
FIG. 7 is a view similar to FIG. 6, but illustrating the closure member at the opened position.

As shown in FIGS. 6 and 7, the second preferred embodiment of the pepper mill according to the present invention has a structure similar to that of the first embodiment. The main difference between this embodiment and the previous embodiment resides in the following.

In this embodiment, the closure unit 3 includes a closure member 33 that has a diameter equal to that at the discharge end 110 of the container body 11 of the receiving unit 1.

In this embodiment, the coupling unit 5 includes a coupling component 52, and an elongated coupling shaft 51 coupled co-rotatably to the coupling component 52, and having a bottom end opposite to the coupling component 52 and secured to the closure member 33 of the closure unit 3 such that movement of the coupling shaft 51 along the axis (L) results in corresponding movement of the closure member 33 relative to the grinding unit 2 between the closed position (see FIG. 6) and the opened position (see FIG. 7). The coupling unit 5 further includes an abutment block 56 coupled fixedly to a top end of the coupling shaft 51 opposite to the bottom end along the axis (L), and abutting against the driving member 12. The closure unit 3 further includes a resilient component 31 abutting against the abutment block 56 and disposed to bias the driving member 12 and the abutment block 56 to move in a direction away from the discharge end 110 of the container body 11.

In use, rotation of the cover member 4 drives the cover member 4 to rotate and move in the direction toward the discharge end 110 of the container body 11 relative to the coupling component 52 in the same manner as the previous embodiment. Simultaneously, movement of the driving member 12 in the direction toward the discharge end 110 of the container body 11 drives the abutment block 56 and the coupling shaft 51 to move in the direction toward the discharge end 110 of the container body 11 relative to the coupling component 52, thereby moving the closure member 33 from the closed position to the opened position. Afterward, the cover member 4 and the driving member 12 are further rotated to drive rotation of the coupling component 52, thereby driving the coupling shaft 51 to actuate grinding action of the grinding unit 2. When the force applied to rotate the cover member 4 is removed, a restoring force of the resilient component 31 biases the abutment block 56 to move in the direction away from the discharge end 110 of the container body 11, thereby driving the driving member 12 to rotate and move in the direction away from the discharge end 110 of the container body 11 relative to the coupling component 52 in the same manner as the previous embodiment. The second preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A pepper mill comprising:
    a receiving unit including
        a container body that surrounds an axis, that defines a receiving space for receiving peppercorns, and that has a discharge end for discharging ground pepper, and
        a driving member disposed movably in said receiving space;
    a coupling unit disposed in said receiving space and driven rotatably by said driving member;
    a grinding unit disposed in said receiving space, and coupled co-rotatably to said coupling unit for grinding the peppercorns in said receiving space to result in the ground pepper; and
    a closure unit including a closure member that is disposed under said grinding unit, and that is movable along the axis relative to said grinding unit between a closed position so as to block discharge of the ground pepper through said discharge end of said container body, and an opened position so as to permit discharge of the ground pepper through said discharge end of said container body.

2. The pepper mill as claimed in claim 1, wherein said closure unit further includes:
    an elongated connecting rod extending along the axis, movable in a direction toward said discharge end of said container body by movement of said driving member, and secured to said closure member such that movement of said connecting rod results in corresponding movement of said closure member relative to said grinding unit; and
    a resilient component disposed to bias said connecting rod to move in a direction away from said discharge end of said container body.

3. The pepper mill as claimed in claim 2, wherein:
    said receiving unit further includes a cover member coupled to one end of said container body opposite to said discharge end, and rotatable about the axis relative to said container body;
    said driving member of said receiving unit is hollow, is coupled co-rotatably to said cover member, and has an annular side wall surrounding the axis, and an end wall connected to said annular side wall;
    said coupling unit includes a hollow shaft wall that extends along the axis and an annular connecting wall that is connected co-rotatably to said hollow shaft wall;
    said connecting rod of said closure unit extends through said coupling unit, and abuts against said end wall of said driving member of said receiving unit;
    one of said annular side wall of said driving member and said annular connecting wall of said coupling unit has a protrusion, and the other one of said annular side wall of said driving member and said annular connecting wall of said coupling unit is formed with a spiral guide groove for receiving slidably said protrusion such that when a force is applied to rotate said cover member, said driving member rotates with said cover member and moves in the direction toward said discharge end of said container body against biasing action of said resilient component of said closure unit until said protrusion reaches an innermost end of said guide groove, thereby driving the movement of said closure member of said closure unit from the closed position to the opened position; and
    said resilient component biases said connecting rod and said driving member to move in the direction away from said discharge end of said container body so as to drive the movement of said closure member from the opened position to the closed position when the force applied to rotate said cover member is removed.

4. The pepper mill as claimed in claim 3, wherein:
    said annular side wall of said driving member is provided with said protrusion; and
    said annular connecting wall of said coupling unit is formed with said guide groove, said guide groove having an open end portion that opens away from said discharge end of said container body, and an abutting end portion that forms an angle with said open end portion relative to the axis.

5. The pepper mill as claimed in claim 3, wherein:
    said grinding unit includes an inner grinding seat coupled to said coupling unit, and a stationary outer grinding seat surrounding said inner grinding seat and cooperating with said inner grinding seat to define a grinding opening therebetween; and
    further rotation of said driving member of said receiving unit with said cover member when said protrusion reaches said innermost end of said guide groove drives said coupling unit to rotate together with said inner grinding seat relative to said outer grinding seat for grinding the peppercorns to result in the ground pepper discharged through said grinding opening.

6. The pepper mill as claimed in claim 3, wherein said cover member of said receiving unit includes a cover wall, and a surrounding wall extending downwardly from a periphery of said cover wall, surrounding said driving member, and having a spline engagement with said driving member of said receiving unit such that said driving member is co-rotatable with said cover member and is movable along the axis relative to said cover member.

7. The pepper mill as claimed in claim 1, wherein said coupling unit includes
    a coupling component driven rotatably by said driving member, and
    a coupling shaft coupled co-rotatably to said coupling component, movable along the axis relative to said coupling component, and having one end opposite to said coupling component and secured to said closure member such that movement of said coupling shaft along the axis results in corresponding movement of said closure member relative to said grinding unit.

8. The pepper mill as claimed in claim 7, wherein:

said receiving unit further includes a cover member coupled rotatably to one end of said container body opposite to said discharge end, said cover member being coupled to and driving said driving member to rotate about the axis relative to said container body and to move in a direction toward said discharge end of said container body;

said coupling shaft of said coupling unit further has another end opposite to said one end along the axis;

said coupling unit further includes an abutment block coupled fixedly to said another end of said coupling shaft and abutting against said driving member, movement of said driving member in the direction toward said discharge end of said container body driving said abutment block and said coupling shaft to move in the direction toward said discharge end of said container body, thereby moving said closure member of said closure unit from the closed position to the opened position; and said closure unit further includes a resilient component abutting against said abutment block and disposed to bias said driving member and said abutment block to move in a direction away from said discharge end of said container body.

9. The pepper mill as claimed in claim 1, wherein said closure member of said closure unit is disposed to block the ground pepper from falling out of said grinding unit when at the closed position.

10. The pepper mill as claimed in claim 1, wherein said closure member of said closure unit is disposed to close said discharge end of said container body of said receiving unit when at the closed position.

* * * * *